United States Patent
Suzuki

(10) Patent No.: US 8,913,470 B2
(45) Date of Patent: Dec. 16, 2014

(54) CONTROL DEVICE, CONTROL METHOD, AND MASTER-DISC FABRICATING APPARATUS

(71) Applicant: Sony Corporation, Tokyo (JP)

(72) Inventor: Yuuichi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/155,561

(22) Filed: Jan. 15, 2014

(65) Prior Publication Data
US 2014/0204724 A1 Jul. 24, 2014

(30) Foreign Application Priority Data
Jan. 22, 2013 (JP) ................................. 2013-009293

(51) Int. Cl.
G11B 7/00 (2006.01)
G11B 7/007 (2006.01)

(52) U.S. Cl.
CPC .................................. *G11B 7/0079* (2013.01)
USPC ...................................................... 369/47.28

(58) Field of Classification Search
None
See application file for complete search history.

(56) References Cited

U.S. PATENT DOCUMENTS

| | | | | |
|---|---|---|---|---|
| 4,949,331 A | * | 8/1990 | Maeda et al. | 369/275.3 |
| 5,756,265 A | * | 5/1998 | Abe et al. | 430/321 |
| 5,882,554 A | * | 3/1999 | Adachi | 264/1.33 |
| 7,136,339 B2 | * | 11/2006 | Kubota et al. | 369/53.29 |
| 7,333,408 B2 | * | 2/2008 | Sano et al. | 369/47.19 |
| 7,551,537 B2 | * | 6/2009 | Tamada | 369/100 |
| 2003/0095481 A1 | * | 5/2003 | Williams et al. | 369/47.28 |
| 2005/0018573 A1 | * | 1/2005 | Kuroda et al. | 369/53.21 |
| 2005/0195511 A1 | * | 9/2005 | Sano et al. | 360/51 |
| 2007/0183276 A1 | * | 8/2007 | Setono | 369/44.28 |
| 2007/0263505 A1 | * | 11/2007 | Fukuyama et al. | 369/47.19 |
| 2008/0025171 A1 | * | 1/2008 | Kuroda et al. | 369/47.19 |

FOREIGN PATENT DOCUMENTS

| | | |
|---|---|---|
| JP | 06-36357 A | 2/1994 |
| JP | 07-287875 A | 10/1995 |
| JP | 2006-119484 A | 5/2006 |
| JP | 2007-1340045 A | 5/2007 |

\* cited by examiner

*Primary Examiner* — Peter Vincent Agustin
(74) *Attorney, Agent, or Firm* — Sony Corporation

(57) ABSTRACT

A control device includes: a delay unit configured to delay a signal for use in exposure of a master disc; and a control unit configured to adjust an amount of delay of the signal so that an exposure pattern that satisfies an information recording medium format is formed on a master disc rotated by a constant linear velocity (CLV) system.

14 Claims, 12 Drawing Sheets

G: GROOVE
L: LAND

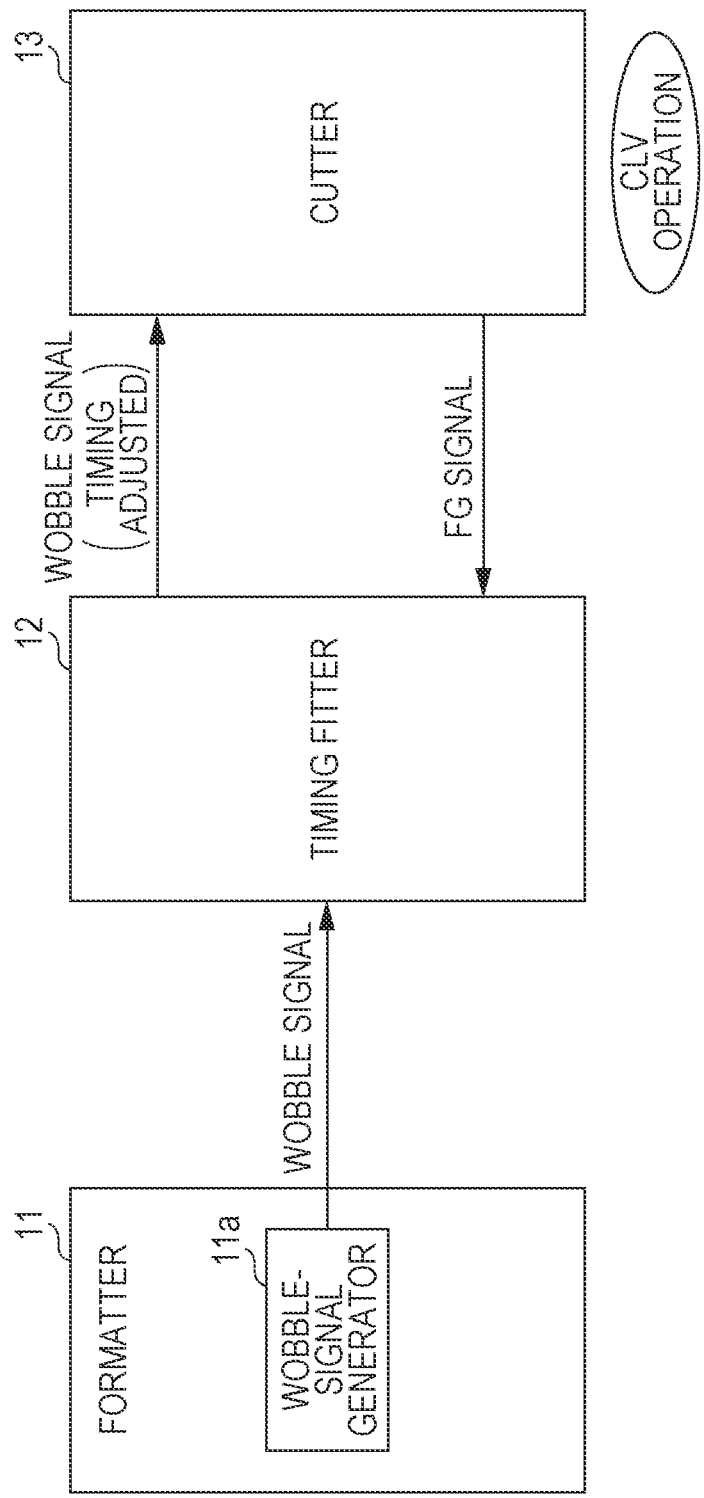

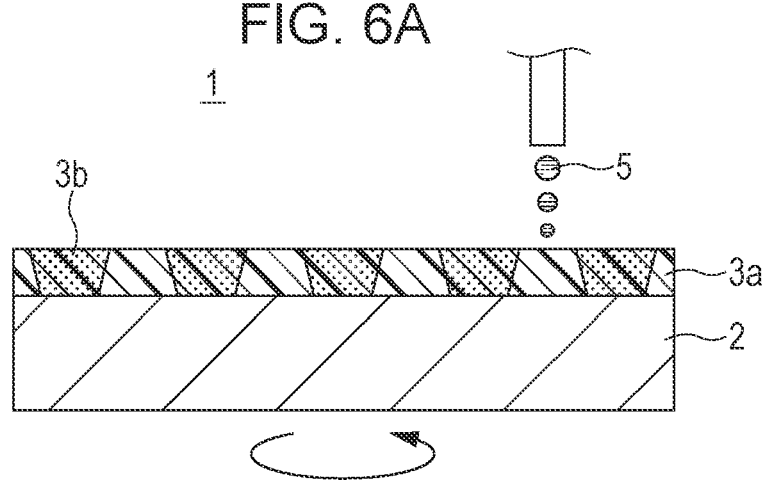
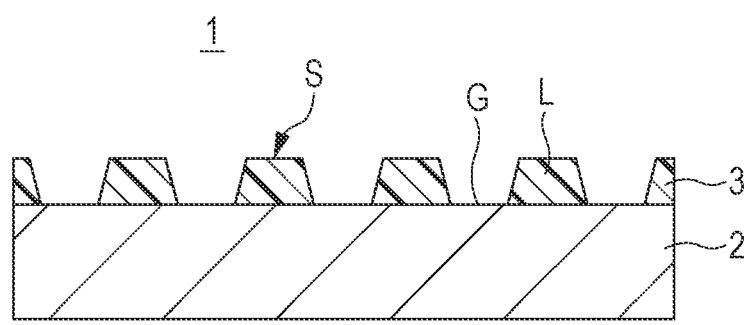

FIG. 7

| ZONE NO. | TRK NO. | ANGULAR REGIONS | | | | | | | | | |
|---|---|---|---|---|---|---|---|---|---|---|---|
| 1 | 1 | | | | | | | | | | |
| | 2 | | | | | | | | | | |
| | 3 | | | | | | | | | | |
| | $n_1-1$ | | | | | | | | | | |
| | $n_1$ | | | | | | | | | | |
| 2 | $n_1+1$ | | | | | | | | | | |
| | $n_1+2$ | | | | | | | | | | |
| | $n_1+3$ | | | | | | | | | | |
| | $n_2-1$ | | | | | | | | | | |
| | $n_2$ | | | | | | | | | | |
| 3 | $n_2+1$ | | | | | | | | | | |
| | $n_2+2$ | | | | | | | | | | |
| | $n_2+3$ | | | | | | | | | | |
| | $n_3-1$ | | | | | | | | | | |
| | $n_3$ | | | | | | | | | | |

FIG. 8

| TRK NO. | NUMBER OF WOBBLES IN TRK | ANGULAR REGION NO. | | | | | | | | | |
|---|---|---|---|---|---|---|---|---|---|---|---|
| | | 1 | 2 | 3 | 4 | 5 | 6 | 7 | 8 | 9 | 10 |
| 1 | 38000 | | | | | | | | | | |
| 2 | 38001 | | | | | | | | | | |
| 3 | 38002 | | | | | | | | | | |
| 4 | 38003 | | | | | | | | | | |
| 5 | 38003 | | | | | | | | | | |
| 6 | 38004 | | | | | | | | | | |
| 7 | 38004 | | | | | | | | | | |
| 8 | 38005 | | | | | | | | | | |
| 9 | 38005 | | | | | | | | | | |
| 10 | 38006 | | | | | | | | | | |
| 11 | 38006 | | | | | | | | | | |
| 12 | 38007 | | | | | | | | | | |
| 13 | 38008 | | | | | | | | | | |
| 14 | 38008 | | | | | | | | | | |
| 15 | 38009 | | | | | | | | | | |
| 16 | 38009 | | | | | | | | | | |
| 17 | 38010 | | | | | | | | | | |
| 18 | 38010 | | | | | | | | | | |
| 19 | 38011 | | | | | | | | | | |
| 20 | 38011 | | | | | | | | | | |

☐ REGION WHOSE NUMBER OF WOBBLES SERVES AS REFERENCE (THE NUMBER OF WOBBLES: 3800)

▨ REGION WHERE THE NUMBER OF WOBBLES IS INCREASED BY 1 RELATIVE TO THE REFERENCE NUMBER OF WOBBLES (THE NUMBER OF WOBBLES: 3801)

▩ REGION WHERE THE NUMBER OF WOBBLES IS INCREASED BY 2 RELATIVE TO THE REFERENCE NUMBER OF WOBBLES (THE NUMBER OF WOBBLES: 3802)

■ REGION WHERE PHASES OF ADJACENT WOBBLES DO NOT MATCH EACH OTHER

◄─► RUB

RECORD-PLAYBACK
CHARACTERISTICS: GOOD

RECORD-PLAYBACK
CHARACTERISTICS: BAD

RECORD-PLAYBACK
CHARACTERISTICS: BAD

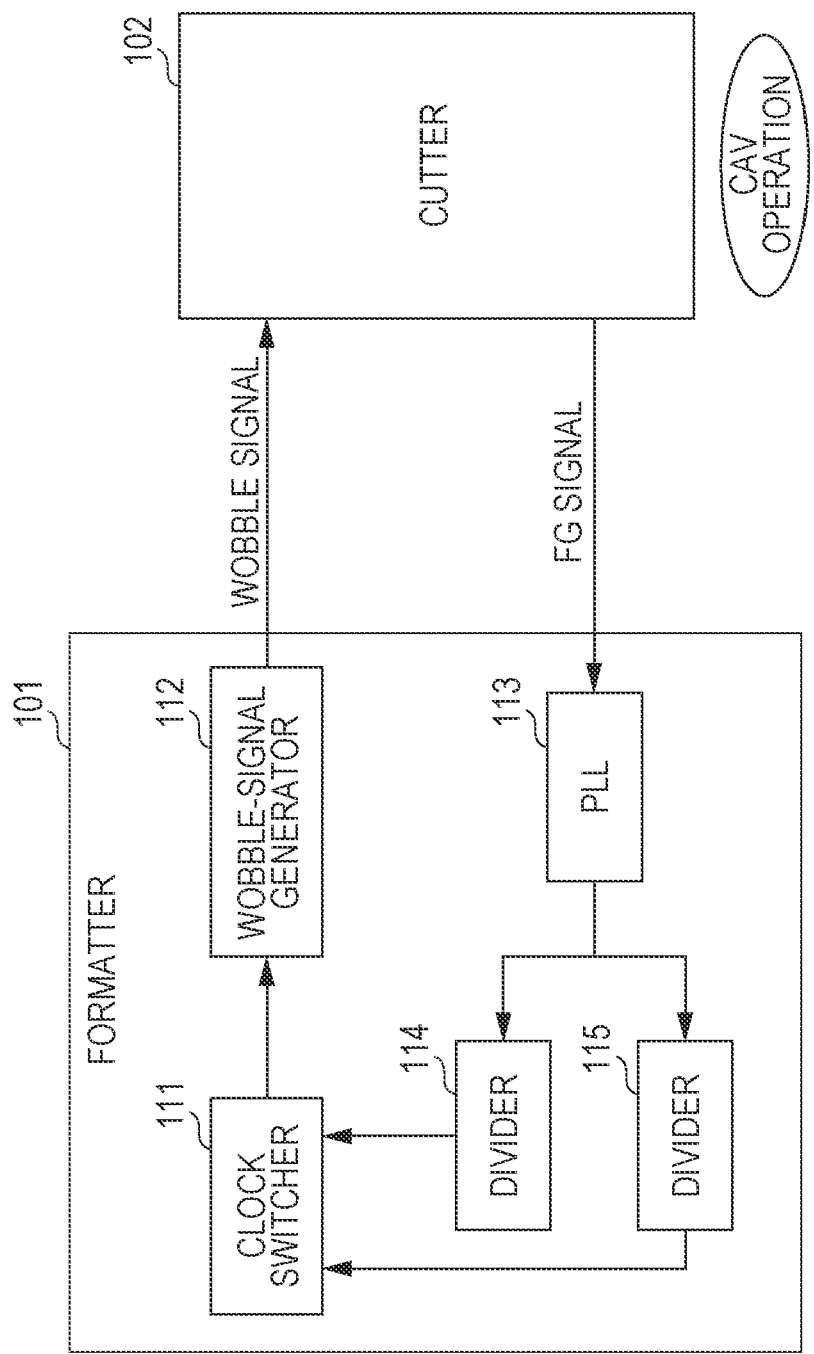

CONTROL DEVICE, CONTROL METHOD, AND MASTER-DISC FABRICATING APPARATUS

CROSS REFERENCE TO RELATED APPLICATIONS

This application claims the benefit of Japanese Priority Patent Application JP 2013-009293 filed Jan. 22, 2013, the entire contents of which are incorporated herein by reference.

BACKGROUND

The present technology relates to control devices, control methods, and master-disc fabricating apparatuses. More specifically, the present technology relates to a control device, a control method, and a master-disc fabricating apparatus which are used to fabricate a master disc for information recording media.

Phase transition mastering (PTM) systems for performing thermal recording have been mainly used as systems for cutting Blu-ray Discs (BDs, registered trademark), which currently have the highest-density optical disc format. Because of the thermal recording, the PTM is suitable for fabricating optical discs that comply with a constant linear velocity (CLV) format. When a land/groove system is employed in order to further increase the density of optical discs, it is desired to perform disc cutting according to a zone constant angular velocity (ZCAV) format.

Heretofore, a system for performing cutting while rotating a master disc at a constant angular velocity (CAV) has been employed in optical-disc master fabrication employing the ZCAV format. FIG. 12 is a block diagram illustrating the schematic configuration of a master-disc fabricating apparatus employing such a cutting system. As illustrated in FIG. 12, this master-disc fabricating apparatus includes a formatter 101 and a cutter 102. The formatter 101 includes a clock switcher 111, a wobble-signal generator 112, a phase locked loop (PLL) 113, and dividers 114 and 115. The formatter 101 generates a wobble signal and supplies the wobble signal to the cutter 102. The cutter 102 generates a frequency-generator (FG) signal, which is a disc-rotation synchronization signal, and supplies the FG signal to the formatter 101. The master-master fabricating apparatus having such a configuration multiplies the FG signal by a PLL clock to perform clock multiplication switching, thereby realizing switching of zones in the ZCAV format.

However, use of the above-described system to perform ZCAV-format disc-master cutting in a PTM system has a problem. Since the master-disc fabricating apparatus having the configuration illustrated in FIG. 12 rotates a master disc by using a CAV system, the local linear velocity changes depending on the radial position, thus making it difficult to form a uniform groove shape. Although a method in which laser power is varied depending on the radial position is also conceivable, it is extremely difficult to set the laser power suitable for the CAV format so as to satisfy the cutting accuracy used for optical discs having a higher recording density than that of BDs. Thus, it is desirable to make it possible to perform ZCAV-format disc-master cutting, while maintaining the rotation of the master disc by using the CLV system.

In addition, in recent years, a variety of formats other than the ZCAV system have also been proposed as master-disc formats, and it is desired that master discs with those formats be also fabricated by the PTM system. It is also desirable that, in fabrication of master discs with those formats, the master discs can be cut while the rotation of the master discs is maintained by the CLV system, as in the case of master discs with the above-described ZCAV format.

As related technologies for addressing the above-described difficulties, some systems have been proposed which vary a formatter drive clock in accordance with a disc radial position by rotating a master disc by using the CLV system (see, for example, Japanese Unexamined Patent Application Publication Nos. 2007-134045, 6-36357, 2006-119484, and 7-287875). In practice, however, it difficult to cut a master disc with any of those systems, as described below.

When a reference clock frequency used for generating a clock used for a frequency divider is calculated using parameters of BD on the basis of the description in paragraph [0054] in Japanese Unexamined Patent Application Publication No. 2007-134045, about a value of $10^{19}$ Hz is yielded (P=0.32 µm, Nf=2024113, and VL=4.917 m/s). This indicates that implementation is extremely difficult with the currently available technology. The technology disclosed in Japanese Unexamined Patent Application Publication No. 6-36357 is also analogous in terms of generating a formatter drive clock by using a frequency divider, and thus suffers a similar problem to that of Japanese Unexamined Patent Application Publication No. 2007-134045.

Japanese Unexamined Patent Application Publication No. 2006-119484 discloses a technology using a direct digital synthesizer (DDS). A DDS digitally generates various output waveforms by using an output of a synchronization circuit that operates in accordance with a reference clock. When attention is given to a relationship between the frequency of the reference clock and the frequency of a signal that can be output, the DDS can also be regarded as one type of frequency divider. Although Paragraph [0025] in Japanese Unexamined Patent Application Publication No. 2006-119484 explains that the DDS of 100 MHz and 32 bits has a frequency resolution of about 0.023 Hz, this is a resolution at the lowest frequency that can be output. In order to realize a desired frequency resolution with the frequency of a reference clock used for an optical disc format, for example, with a frequency of about 66 MHz which is the frequency of a 1× speed channel clock in the case of BD, a very high reference-clock frequency is still necessary.

The technology disclosed in Japanese Unexamined Patent Application Publication No. 7-287875 concerns a system in which a voltage-controlled oscillator (VCO) is used to generate a formatter drive clock to be used. However, the VCO is a device that can provide a sufficiently accurate clock output when used in a feedback loop in a PLL. In Japanese Unexamined Patent Application Publication No. 7-287875, the VCO 5 illustrated in FIG. 1 is not feedback-controlled and is used alone. A frequency difference for each track on a BD is about 0.001% even at the inner circumference, and a desired clock accuracy is even higher than this value. With current technologies, it is yet extremely difficult without feedback control to realize a VCO that stably outputs a clock with such high accuracy in accordance with a digital-to-analog (D/A) output value.

SUMMARY

Accordingly, it is desirable to provide a control device, a control method, and a master-disc fabricating apparatus which make it possible to perform master-disc cutting that complies with a CAV system or another system while controlling the rotation of a master disc by using a CLV system.

According to one embodiment of the present technology, there is provided a control device. The control device includes: a delay unit configured to delay a signal for use in exposure of a master disc; and a control unit configured to adjust an amount of delay of the signal so that an exposure pattern that satisfies an information recording medium format is formed on a master disc rotated by a CLV system.

According to another embodiment of the present technology, there is provided a control method. The control method includes adjusting an amount of delay of a signal for use in exposure of a master disc so that an exposure pattern that satisfies an information recording medium format is formed on the master disc rotated by a CLV system.

According to yet another embodiment of the present technology, there is provided a master-disc fabricating apparatus. The master-disc fabricating apparatus includes: a signal generation device configured to generate a signal; an exposure device configured to expose a master disc on the basis of the signal supplied from the signal generation device; and a control device configured to adjust an amount of delay of the signal supplied from the signal generation device to the exposure device. The control device includes: a delay unit configured to delay a signal for use in exposure of the master disc, and a control unit configured to adjust the amount of delay of the signal so that an exposure pattern that satisfies an information recording medium format is formed on the master disc rotated by a CLV system.

As described above, according to the present technology, it is possible to perform master-disc cutting that complies with a CAV system or another system while controlling rotation of a master disc by using a CLV system.

BRIEF DESCRIPTION OF THE DRAWINGS

FIG. 3 is a schematic diagram illustrating one example configuration of the master-disc fabricating apparatus according to the first embodiment of the present technology;

FIGS. 6A and 6B illustrate processes in the master-disc manufacturing method according to the first embodiment of the present technology;

FIG. 7 is a schematic diagram illustrating the format of zones;

FIG. 8 is a schematic diagram illustrating the format of angular regions;

FIG. 12 is a block diagram illustrating the schematic configuration of a master-disc fabricating apparatus that enables optical-disc master cutting that complies with a ZCAV format master disc while controlling the rotation of a master disc by using a CAV system.

DETAILED DESCRIPTION OF EMBODIMENTS

Embodiments of the present technology will be described below in the following order with reference to the accompanying drawings.

1. First Embodiment (Example of Master-Disc Fabricating Apparatus Capable of Performing Cutting That Complies With Format of ZCAV System)
   1-1. Overview
   1-2. Structure of Master Disc
   1-3. Format of Master Disc
   1-4. Configuration of Master-Disc Fabricating Apparatus
   1-5. Configuration of Timing Fitter
   1-6. Master-Disc Manufacturing Method
   1-7. Advantage
2. Second Embodiment (Example of Master-Disc Fabricating Apparatus Capable of Performing Cutting That Complies with Format of Disc Angular-Region Division System)
   2-1. Overview
   2-2. Format of Master Disc
   2-3. Configuration of Timing Fitter
   2-4. Advantage
3. Modification

1. First Embodiment

[1-1. Overview]

In a first embodiment, a description will be given of a technology that makes it possible to perform master-disc cutting according to a ZCAV format while controlling rotation of a master disc by a complete CLV operation and that employs a configuration in which a formatter is implemented by a digital circuit that operates in accordance with a fixed clock.

[1-2. Structure of Master Disc]

Figure 1:
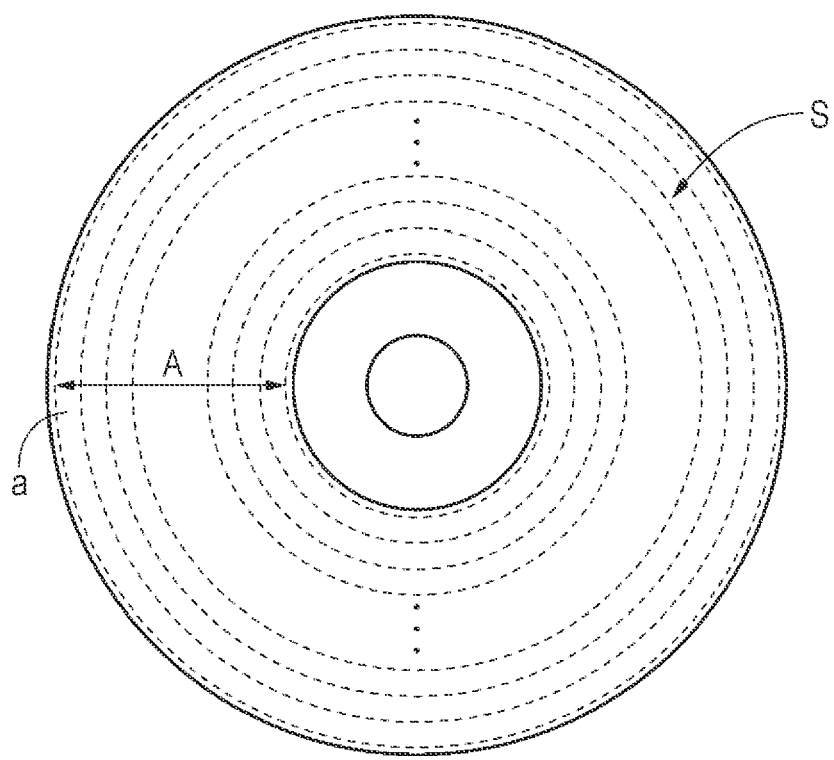
FIG. 1 is a plan view illustrating one example configuration of a master disc fabricated by a master-disc fabricating apparatus according to a first embodiment of the present technology.
Figure 2A:
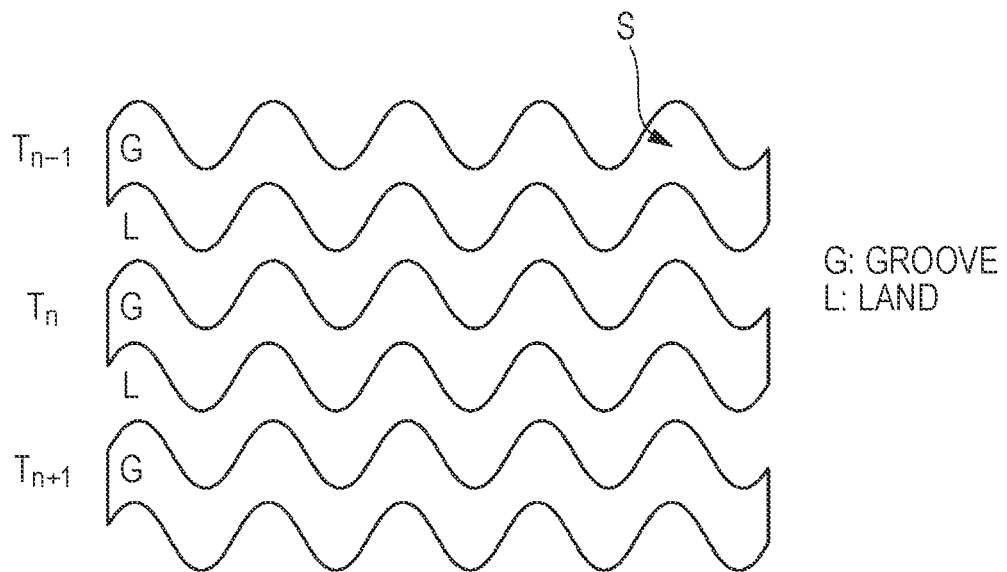
FIG. 2A is an enlarged plan view illustrating a portion of a formed surface of the master disc illustrated in FIG. 1.
Figure 2B:
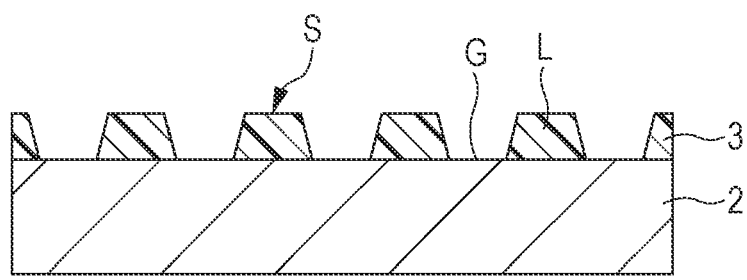
FIG. 2B is an enlarged sectional view illustrating a portion of a cross section of the master disc illustrated in FIG. 1.

FIG. 1 is a plan view illustrating one example configuration of a master disc fabricated by a master-disc fabricating apparatus according to the first embodiment of the present technology. FIG. 2A is an enlarged plan view illustrating a portion of a formed surface of the master disc illustrated in FIG. 1. FIG. 2B is an enlarged sectional view illustrating a portion of a cross section of the master disc illustrated in FIG. 1. A master disc 1 is a master disc for fabricating optical-information recording media and is used to fabricate replicated master discs (e.g., stampers) or substrates. Examples of the optical-information recording media fabricated using the master disc 1 include digital versatile discs (DVDs), BDs, and next-generation optical discs having a recording density higher than that of BDs.

The master disc 1 has a disk shape, as illustrated in FIG. 1, and one major surface of the master disc 1 is a formed surface S. As illustrated in FIGS. 2A and 2B, the formed surface S is a corrugated surface having a groove G and a land L. Herein, a portion exposed to laser light or the like during fabrication of a master disc is referred to as a groove G, and a portion sandwiched between adjacent grooves is referred to as a "land L". FIG. 2B illustrates an example in which a depression portion of a corrugated surface is a groove G and a projection portion thereof is a land L.

Examples of the shapes of the groove G and the land L include various shapes, such as a spiral shape and a concentric circular shape. The groove G and/or the land L is wobbled (meandered) for, for example, linear-speed stabilization and address-information addition. One of the groove G and the land L is used as a track for recording information signals. A description below will be given of an example in which the groove G is used as a track.

As illustrated in FIG. 2B, the master disc 1 has a substrate 2 and a shape layer 3 provided on a surface of the substrate 2. Examples of the substrate 2 include a silicon substrate and a glass substrate. It is preferable that an inorganic resist be used as material of the shape layer 3. For example, an oxide of metal, such as transition metal, can be used as the inorganic resist. The shape layer 3 has a groove G and a land L.

[1-3. Format of Master Disc]

The master disc 1 is a master disc that complies with a ZCAV format. More specifically, the master disc 1 has a recording area A with a circular-ring shape, as illustrated in FIG. 1. The recording area A has multiple zones a sequentially set from an inner circumference thereof toward an outer circumference (i.e., in a radial direction). The recording area A corresponds to data recording areas of optical-information recording media fabricated using the master disc 1.

[1-4. Configuration of Master-Disc Fabricating Apparatus]

FIG. 3 is a schematic diagram illustrating one example configuration of the master-disc fabricating apparatus according to the first embodiment of the present technology. The master-disc fabricating apparatus is a system that enables master-disc cutting according to the ZCAV format while controlling the rotation of the master disc 1 with a complete CLV operation. The master-disc fabricating apparatus includes a digital circuit that operates in accordance with a fixed clock. As illustrated in FIG. 3, the master-disc fabricating apparatus includes a formatter 11 that serves as a signal generation device, a timing fitter 12 that serves as a control device, and a cutter 13 that serves as an exposure device. The timing fitter 12 is provided between the formatter 11 and the cutter 13.

(Formatter)

The formatter 11 includes a digital circuit that operates in accordance with a fixed clock and uses the fixed clock to generate information signals for use in exposure of the master disc 1. The information signals are, for example, wobble signals having a single-frequency which comply with a predetermined optical-disc format. Although the following description is given of a case in which the information signals are single-frequency wobble signals, the information signals are not limited to this example.

More specifically, the formatter 11 has a wobble-signal generator 11a, which uses the fixed clock to generate single-frequency wobble signals to be used as recording signals and supplies the generated wobble signals to the timing fitter 12. The formatter 11 may be implemented by an existing formatter that is used for fabricating a master for optical discs.

(Cutter)

The cutter 13 serves as an exposure device for exposing the master disc 1 by irradiating it with laser light or the like. The cutter 13 controls the rotation of the master disc 1 for optical discs by using a CLV system. On the basis of the wobble signals supplied from the timing fitter 12, the cutter 13 controls the irradiation pattern of laser light with which the master disc 1 is irradiated, to form a predetermined exposure pattern on a surface of a resist layer of the master disc 1. The predetermined exposure pattern complies with a ZCAV format for optical discs. The cutter 13 has a spindle motor (not illustrated) provided with a frequency generator (FG). FG signals (rotation-information signals) are output from the FG and are supplied to the timing fitter 12. The cutter 13 can be implemented by an existing cutter that is used for fabricating a master for optical discs.

(Timing Fitter)

The timing fitter 12 serves as a signal processing circuit that finely adjusts the timing at which the wobble signals are supplied from the formatter 11 to the cutter 13. More specifically, the timing fitter 12 adjusts the amount of delay of the single-frequency wobble signals, supplied from the formatter 11 to the cutter 13, so that an exposure pattern that satisfies the ZCAV format is formed on the master disc 1 rotated by the CLV system.

Using the FG signals supplied from the cutter 13, the timing fitter 12 determines a reference time. The aforementioned amount of delay of the wobble signals is adjusted based on the reference time.

[1-5 Configuration of Timing Fitter]

Figure 4:
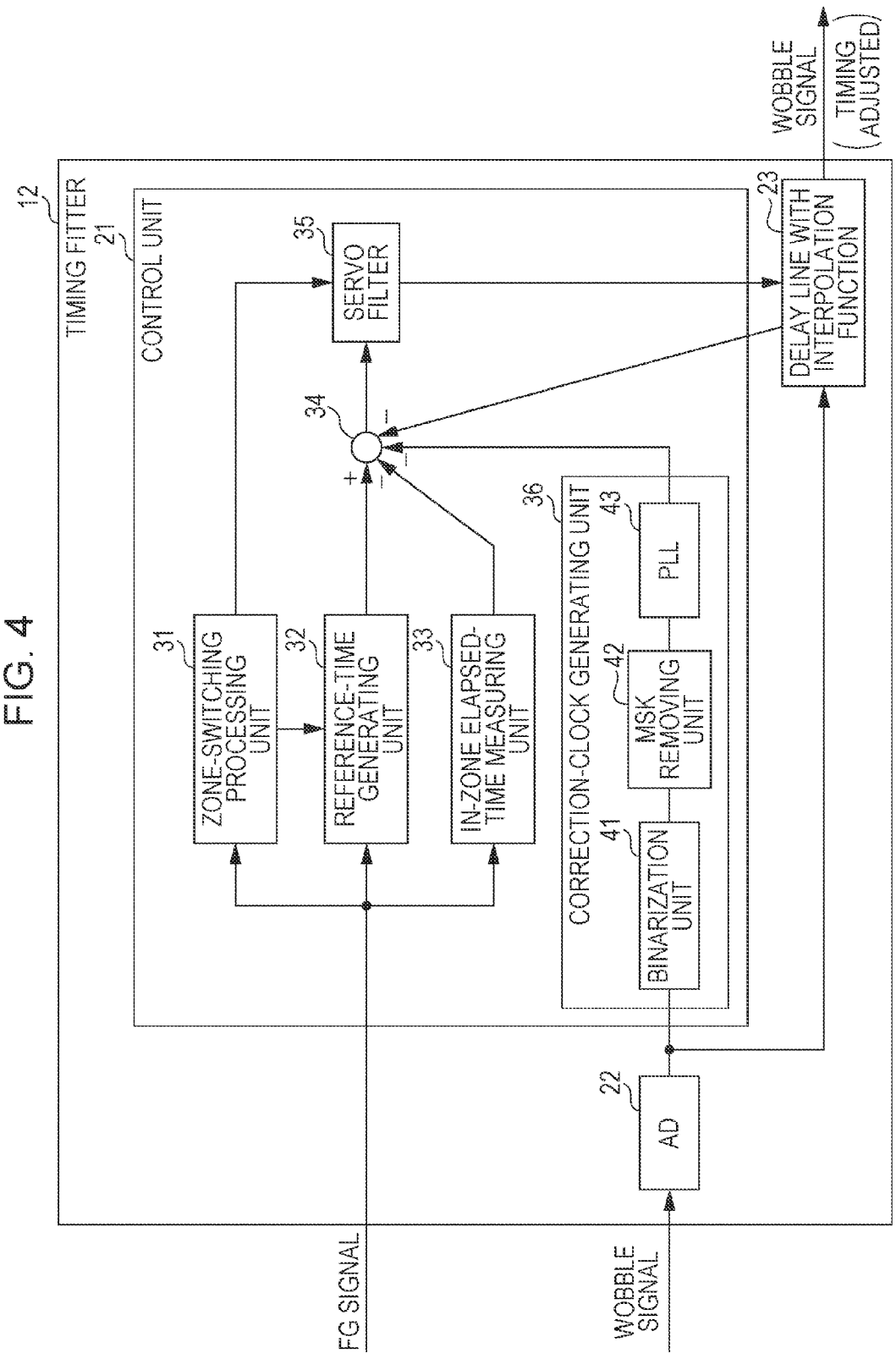
FIG. 4 is a block diagram illustrating one example configuration of a timing fitter according to the first embodiment of the present technology.

FIG. 4 is a block diagram illustrating one example configuration of the timing fitter. As illustrated in FIG. 4, the timing fitter 12 includes a control unit 21, an analog-to-digital (AD) converter 22, and a delay line 23 with an interpolation function.

In this case, a description will be given of a BD by way of example, and it is assumed that clocks in the circuit in the timing fitter 12 operate at a cycle of 1T at 1× speed. Since one cycle of each wobble signal is 69T, one cycle of each wobble signal corresponds to 69 clocks.

(Control Unit)

The control unit 21 adjusts the amount of delay of the wobble signals in the delay line 23 with the interpolation function so as to satisfy the number of wobbles per revolution of the master disc 1 that complies with the ZCAV format. More specifically, by using the FG signals supplied from the cutter 13, the control unit 21 determines a reference time for satisfying the number of wobbles per revolution that complies with the ZCAV format. On the basis of the reference time, the control unit 21 adjusts the amount of delay of the wobble signals in the delay line 23 with the interpolation function.

As illustrated in FIG. 4, the control unit 21 includes a zone-switching processing unit 31, a reference-time generating unit 32, an in-zone elapsed-time measuring unit 33, a computing unit 34, a servo filter 35, and a correction-clock generating unit 36.

(Zone-Switching Processing Unit)

When exposure of the master disc 1 is started, the zone-switching processing unit 31 issues a notification designating the number of wobbles per revolution of the master disc 1 in the zone a at the innermost circumference to the reference-time generating unit 32, the number of wobbles being stipulated in a standard for a ZCAV zone structure (specifically, a standard for the structure of the zones a illustrated in FIG. 1).

The zone-switching processing unit 31 counts the FG signals input from the cutter 13 to the timing fitter 12, from when the exposure of the master disc 1 is started. The zone-switching processing unit 31 performs zone-switching processing by changing the number of wobbles per master-disc revolution, the number being designated for the reference-time generating unit 32, at a timing according to the standard for the ZCAV zone structure (specifically, the standard for the structure of the zones a illustrated in FIG. 1), that is, at a timing corresponding to a boundary position of each zone a. The count value of the input FG signals may be reset each time the ZCAV zone a is switched, and the counting of input FG signals may be resumed.

More specifically, the zone-switching processing unit 31 counts the FG signals input to the timing fitter 12 and determines whether or not a cutting position (an exposure position) has reached a ZCAV zone-switching position (specifically, the boundary position of each of the zones a illustrated in FIG. 1), on the basis of the count value. Upon determining that the cutting position has reached the ZCAV zone-switching position, the zone-switching processing unit 31 changes the number of wobbles per master-disc revolution, the number being designated for the reference-time generating unit 32. On the other hand, upon determining that the cutting position has not reached the ZCAV zone-switching position, the zone-switching processing unit 31 maintains the current number of wobbles per master-disc revolution, the number being designated for the reference-time generating unit 32.

The timing fitter 12 has, for example, a storage unit (not illustrated) in which the count values of input FG signals, the count values corresponding to the boundary positions of the zones for ZCAV, are stored. The above-described zone-switching position can be determined based on the input-FG-signal count values stored in the storage unit.

The zone-switching processing unit 31 supplies the count value of in-zone FG signals to the reference-time generating unit 32. It is preferable that the zone-switching processing unit 31 set an integrator setting value for the servo filter 35 to a value reflecting a speed change. With such an arrangement, correction corresponding to the speed change can be performed by feedforward. Thus, even in the boundary of each zone, correction that follows the reference time can be maintained with high accuracy.

(Reference-Time Generating Unit)

As described above, FG signals are supplied from the cutter 13 to the reference-time generating unit 32. The notification designating the number of wobbles per revolution is issued from the zone-switching processing unit 31 to the reference-time generating unit 32, and also the count value of in-zone FG signals is supplied from the zone-switching processing unit 31 to the reference-time generating unit 32.

Each time an FG signal (a pulse of an FG signal) is input from the cutter 13 to the reference-time generating unit 32, the reference-time generating unit 32 determines a desirable elapsed time (an elapsed time from starting of the exposure in each zone a) as the reference time, on the basis of clocks in the timing fitter 12. The determined elapsed time is used for correctly satisfying the designated number of wobbles per revolution. The reference time (in units of clocks) is determined in accordance with, for example, equation (1) below:

The reference time (in units of clocks)=[(the designated number of wobbles per revolution)×(the number of clocks corresponding to one wobble)]×[(the count value of in-zone FG signals)÷(the number of FG teeth per revolution)]  (1)

In equation (1), "the designated number of wobbles per revolution", "the number of clocks corresponding to one wobble", "the count value of in-zone FG signals", and "the number of FG teeth per revolution" are defined as follows:

The designated number of wobbles per track: the designated number of wobbles per track corresponding to each zone a on the master disc 1.

The number of clocks corresponding to one wobble: the number of clocks in the timing fitter, the clocks corresponding to one wobble (in this case, 69 clocks in the example of the BD).

The count value of in-zone FG signals: the number of input FG signals counted by the timing fitter 12 for each ZCAV zone a.

The number of FG teeth per revolution: the FG teeth per revolution of the spindle motor of the cutter 13.

For example, "the number of clocks corresponding to one wobble" (e.g., 69 clocks) and "the number of FG teeth per revolution" are stored in the above-described storage unit. These values are used to calculate the reference time, for example, in accordance with equation (1) noted above.

(In-Zone Elapsed-Time Measuring Unit)

The in-zone elapsed-time measuring unit 33 measures an in-zone elapsed time by using the clocks in the timing fitter 12. When an FG signal (a pulse of an FG signal) is input from the cutter 13, the in-zone elapsed-time measuring unit 33 supplies the measured elapsed time to the computing unit 34. At the timing when an FG signal (a pulse of an FG signal) is input, it is possible to determine a time error by subtracting the measured elapsed time from the above-described reference time. The term "in-zone elapsed time" refers to an elapsed time from starting of the exposure in each zone a, specifically, an elapsed time from when the notification designating the number of wobbles per master-disc revolution is issued from the zone-switching processing unit 31 to the reference-time generating unit 32 or from when processing for changing the number of wobbles per master-disc revolution is started.

(AD Converter)

The AD converter 22 performs AD conversion on the wobble signals supplied from the formatter 11 and supplies the resulting wobble signals to the correction-clock generating unit 36 and the delay line 23 with the interpolation function.

(Correction-Clock Generating Unit)

By using the wobble signals supplied from the formatter 11, the correction-clock generating unit 36 generates a correction clock. The "correction clock" is a signal for performing correction corresponding to a displacement between the clock of the formatter 11 and the clock of the timing fitter 12.

In the present embodiment, the timing fitter 12 and the formatter 11 operate in accordance with respective clocks that are different from each other. Even if the cycle error of those clocks is about $10 \times 10^{-6}$, considering that the number of wobbles per disc revolution exceeds a hundred thousand at the outer circumference, a time error that can exceed one wobble per revolution occurs. Accordingly, it is preferable that the timing fitter 12 be provided with the correction-clock generating unit 36 so as to correct the displacement between the clocks.

The correction-clock generating unit 36 includes a binarization unit 41, a minimum-shift keying (MSK) removing unit 42, and a phase locked loop (PLL) unit 43. The binarization unit 41 binarizes the wobble signals supplied from the AD converter 22 and supplies the resulting wobble signals to the MSK removing unit 42. The MSK removing unit 42 removes MSK marks from the wobble signals supplied from the binarization unit 41 and supplies the resulting wobble signals to the PLL unit 43. The PLL unit 43 compares the phase of the input signals supplied from the MSK removing unit 42 with the phase of a wobble periodic signal generated according to the clocks in the timing fitter 12 and supplies a correction clock for correcting a phase displacement to the computing unit 34.

(Computing Unit)

The reference time, the in-zone elapsed time, the correction clock, and the amount of delay are supplied to the computing unit 34 from the reference-time generating unit 32, the in-zone elapsed-time measuring unit 33, the correction-clock generating unit 36, and the delay line 23 with the interpolation function, respectively.

A summary of the reference time, the in-zone elapsed time, the correction clock, and the amount of delay is given below.

The reference time: a desirable elapsed time (an elapsed time from starting of the exposure in each zone a) for correctly satisfying the designated number of wobbles per revolution.

The in-zone elapsed time: an elapsed time from starting of the exposure in each zone a.

The correction clock: a signal for performing correction corresponding to a displacement between the clock of the formatter 11 and the clock of the timing fitter 12.

The amount of delay: the amount of delay in the delay line 23 with the interpolation function.

At the timing when an FG signal (a pulse of an FG signal) is input, a time error (an error signal) can be determined by subtracting the elapsed time from the reference time. Further subtracting the correction clock from the error signal makes it possible to perform correction corresponding to a displacement between the clock of the formatter 11 and the clock of the timing fitter 12. Further subtracting the amount of delay in the delay line 23 with the interpolation function from the error signal forms a feedback loop.

(Servo Filter)

The servo filter 35 uses, for example, a proportional-integral (PI) control filter to achieve the intended servo performance while performing feedback-control phase compensation for the delay line 23 with the interpolation function.

(Delay Line with Interpolation Function)

The delay line 23 with the interpolation function buffers wobble signals supplied from the AD converter 22, varies an output update rate in accordance with outputs from the servo filter 35, performs linear interpolation, and then outputs the resulting signals to the cutter 13. Thus, the timing at which wobble signals are input to the cutter 13 is finely adjusted. With a certain amount of delay being set as an origin for the delay line 23 with the interpolation function, the output update rate can also be increased or reduced in accordance with an input signal. An output of the amount of delay in the delay line 23 with the interpolation function has a value resulting from integration of an update rate designated by an output of the servo filter 35. Accordingly, the entire feedback loop can be regarded as a feedback control loop of a plant having integration properties.

As a result of the operation of the delay line 23 with the interpolation function, the wobble signals generated by the formatter 11 that operates in accordance with the fixed clock can be smoothly output while being synchronized with the rotation of a spindle of the cutter 13.

[1-6. Master-Disc Manufacturing Method]

Next, one example of a master-disc manufacturing method using the above-described master-disc fabricating apparatus will be described with reference to FIGS. 5A to 5C and FIGS. 6A and 6B. This master-disc manufacturing method is preferably applied to a method for manufacturing a master disc for high-density optical discs, such as Blu-ray Discs (registered trademark).

Figure 5A:
FIGS. 5A to 5C illustrate processes in a master-disc manufacturing method according to the first embodiment of the present technology.
Figure 5B:
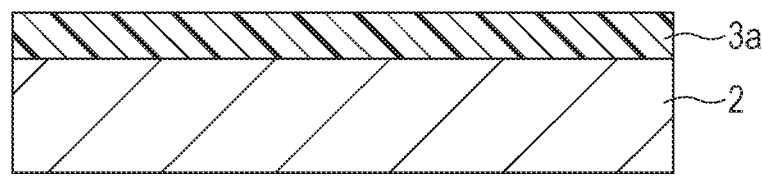

As illustrated in FIG. 5A, a smooth substrate 2 made of, for example, silicon or the like is fabricated. Next, as illustrated in FIG. 5B, a resist layer 3a is deposited on the substrate 2, for example, by sputtering. As a result, a master disc 1 with the resist layer 3a is obtained. Material of the resist layer 3a may be, for example, an inorganic resist.

Figure 5C:
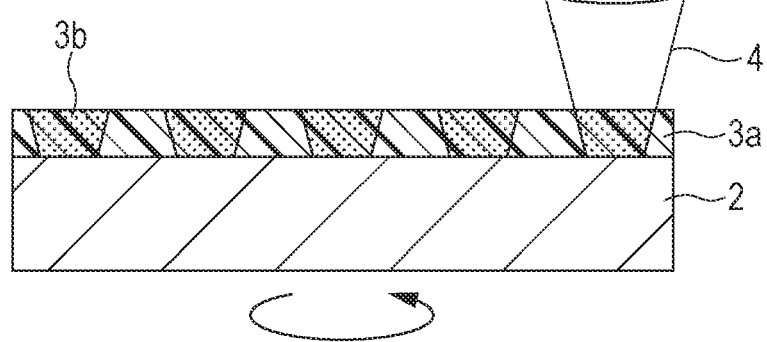

Next, the master disc 1 is placed on a turntable (not illustrated) for the cutter 13 in the above-described master-disc fabricating apparatus. Next, as illustrated in FIG. 5C, the master disc 1 is rotated and driven by the CLV system, and the resist layer 3a is irradiated with an exposure beam 4 to expose an entire surface of the resist layer 3a. During the exposure, the amount of delay of wobble signals for use in exposure of the master disc 1 is adjusted so that an exposure pattern that satisfies the ZCAV format is formed on the resist layer 3a of the master disc 1 rotated by the CLV system. As a result, latent image 3b corresponding to wobble grooves that comply with the ZCAV format is formed on the entire surface of the resist layer 3a.

Next, as illustrated in FIG. 6A, while the substrate 2 is being rotated, a developer 5 is applied to the resist layer 3a and a development process is performed on the resist layer 3a. As a result, a wobble groove G that complies with the ZCAV format is formed on the entire surface of the resist layer 3a, as illustrated in FIG. 6B. This yields an intended master disc 1.

[1-7. Advantage]

According to the first embodiment, with a configuration using a fixed-clock digital circuit, it is possible to facilitate cutting of a master-disc with a ZCAV format, while rotating the master disc 1 in a CLV system completely.

2. Second Embodiment

[2-1. Overview]

When a groove recording system is used to increase the density of typical CLV format discs, a wobble phase difference relative to an adjacent track changes continuously and this change causes variations in recording-and-playback quality and address-playback quality. When the density of the optical-information recording media is further increased, signal deterioration due to a mismatch between the phases of adjacent wobbles becomes prominent because of two factors, namely, a reduction in track pitch and an increase in linear density. Accordingly, the present inventor has made intensive and extensive studies in order to overcome the problem and has conceived a system for making the phases of adjacent wobbles match each other in a majority of areas of an optical-information recording medium while achieving compliance with the CLV format. This system is, specifically, a system in which angular regions divided radially from a center of the optical-information recording medium are set and a range where the phases of wobbles do not match the phases of adjacent wobbles is limited to the range of one angular region in one track. This system is herein referred to as a "disc angular-region division system".

According to knowledge possessed by present inventor, in the related technologies for fabricating a master disc, it is difficult to perform master-disc cutting according to the disc angular-region division system by using the PTM system, for the same reason that it is difficult to perform master-disc cutting according to the ZCAV system by using the PTM system. Accordingly, in a second embodiment, a description will be given of a technology that makes it possible to perform master-disc cutting according to the disc angular-region division system by using the PTM system.

[2-2. Format of Master Disc]

(Zone)

FIG. 7 is a schematic diagram illustrating the format of zones. As illustrated in FIG. 7, each zone a in a master disc 1 according to the second embodiment has multiple regions divided radially from the center of the master disc 1 (these regions are hereinafter referred to as "angular regions"). In FIG. 7, each zone a has been converted into a rectangle shape, for ease of illustration. In FIG. 7, although a case in which the number of zones a is three is illustrated, the number of zones a is not limited to this example.

The number of divided angular regions differs from one zone a to another, and the number of divided angular regions increases toward the outer circumference side. For example, when the recording area A in the master disc 1 is divided into three zones, namely, first to third zones a, "10", "15", and "30" are selected as the numbers of divisions for the first, second, and third zones a, respectively.

(Angular Regions)

FIG. 8 is a schematic diagram illustrating the format of the angular regions. FIG. 8 illustrates an example in which the recording area A on the master disc 1 is divided into ten equal regions radially from the center thereof. For ease of description, a condition in this case is that 38000 wobbles exist in a first track and about 2.5 RUBs (recording unit blocks) exist per track. The RUB is a unit for recording main data (i.e., recording/playback data) and has a predetermined length, for example, 64 kilobytes. The RUB is also a unit of an error correction block.

The recording area A on the master disc 1 has phase mismatch ranges where the phases of wobbles are displaced from the phases of adjacent wobbles and phase match ranges where the phases of wobbles match the phases of adjacent wobbles. The phase mismatch range is a partial range in one track, and the phase match ranges are remaining ranges in the track. The phase mismatch range is provided, for example, on an angular-region basis.

Figure 9A:
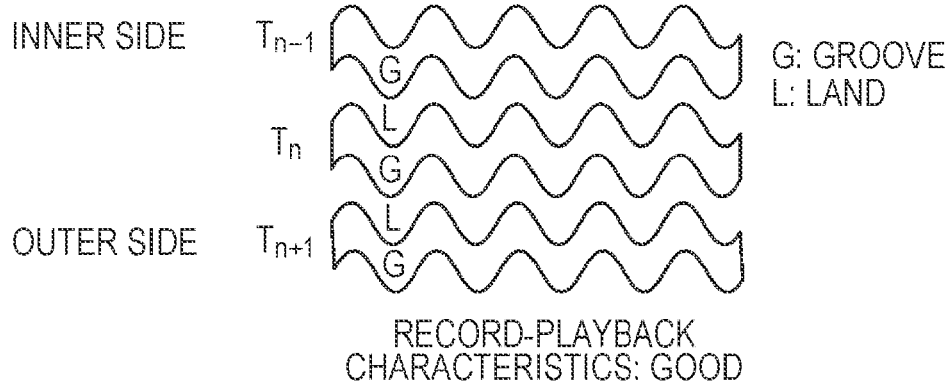
FIG. 9A is a schematic diagram illustrating an area where the phases of wobbles are the same as the phases of adjacent wobbles both at the inner circumference side and the outer circumference side.

FIG. 9A is a schematic diagram illustrating an area where the phases of wobbles are the same as the phases of adjacent wobbles at the inner circumference side and the outer circumference side. For example, in angular regions denoted by angular-region numbers "2 to 4" and "6 to 10" in track (TRK) number "2", the phases of wobbles are the same as the phases of the adjacent wobbles at the inner circumference side and the outer circumference side, as illustrated in FIG. 9A.

Figure 9B:
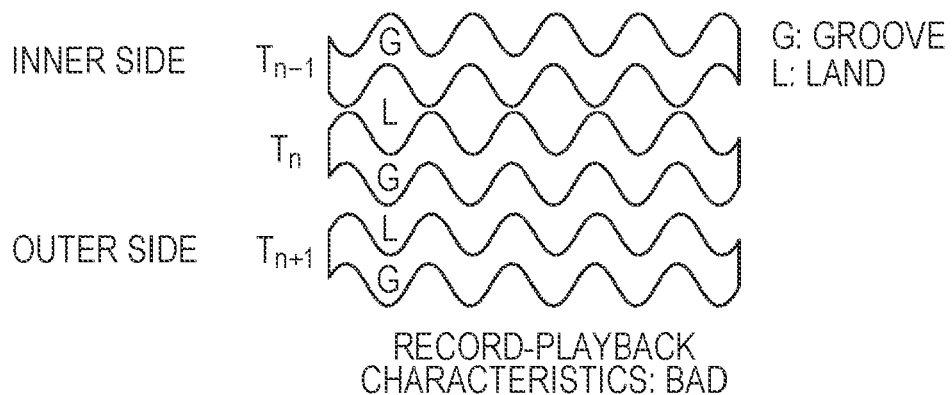
FIG. 9B is a schematic diagram illustrating an area where the phases of wobbles are different from adjacent wobbles at the inner circumference side and are the same as the phases of adjacent wobbles at the outer circumference side.

FIG. 9B is a schematic diagram illustrating an area where the phases of wobbles are different from adjacent wobbles at the inner circumference side and are the same as the phases of adjacent wobbles at the outer circumference side. For example, in an angular region denoted by angular-region number "1" in track (TRK) number "2", the phases of wobbles are different from the phases of the adjacent wobbles at the inner circumference side, whereas the phases of wobbles are the same as the phases of the adjacent wobbles at the outer circumference side, as illustrated in FIG. 9B.

Figure 9C:
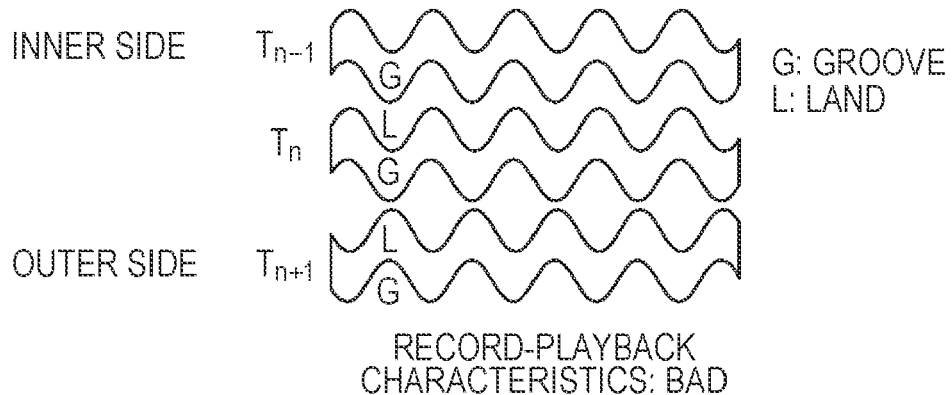
FIG. 9C is a schematic diagram illustrating an area where the phases of wobbles are the same as adjacent wobbles at the inner circumference side and are different from the phases of adjacent wobbles at the outer circumference side.

FIG. 9C is a schematic diagram illustrating an area where the phases of wobbles are the same as adjacent wobbles at the inner circumference side and are different from the phases of adjacent wobbles at the outer circumference side. For example, in an angular region denoted by angular-region number "5" in track (TRK) number "2", the phases of wobbles are the same as the phases of the adjacent wobbles at the inner circumference side, whereas the phases of wobbles are different from the phases of the adjacent wobbles at the outer circumference side, as illustrated in FIG. 9C.

The total number of wobbles in one track increases, for example, by one at a rate of once every track or once every two tracks, going from the center toward the outer circumference. In an example of parameters of Blu-ray Disc XL (BDXL), the length of one track on a master disc 1 precisely cut as specified by the standard increases by an amount corresponding to about 0.5 wobble, going toward the outer circumference by one track. Accordingly, it is basically sufficient to increase wobbles at a rate of one wobble every two tracks. Places where the number of wobbles is increased by one per track may also exist sporadically in order to correct an accumulated error. The additional wobbles are, for example, sequentially allocated to the angular regions.

It is preferable that the increase of wobbles be performed in a partial range in one track, preferably, in a smaller range than one RUB (i.e., one error correction block) per track, and more preferably, in only one angular region per track. With this arrangement, the continuous range where the phases of wobbles do no match the phases of adjacent wobbles can be limited to a partial range in one track, preferably, a smaller range than one RUB, and more preferably, to one angular region. FIG. 8 illustrates an example in which the range where the phases of wobbles do not match the phases of adjacent wobbles is limited to about one-fourth the RUB, which is a unit of an error correction block. In addition, a change in wobble length in an angular region where one wobble has been increased is 0.03% or less, which can sufficiently satisfy the wobble-length error specification for the existing BD format.

It is preferable that the order of angular regions where the number of wobbles is to be increased be appropriately determined in order to avoid simultaneous occurrence of different phase portions at the inner and outer circumferences of a certain RUB. In the example of BD, 2.7 RUBs or more exist per track, even at the innermost circumference. Accordingly, when the gap between the regions where wobbles are to be increased is greatly increased relative to a distance corresponding to one RUB, it is possible to avoid simultaneous generation of different-phase portions at the inner circumference and the outer circumference of a certain RUB. For example, when each zone a on the master disc 1 is divided into 10 regions, it is conceivable to set the order of angular regions where a different-phase portion occurs, in the following manner:

1→5→9→2→7→3→8→4→10→6→1 . . . (this order is then repeated).

Setting the angular regions in such a manner can ensure that different-phase portions are placed away from each other by 4/10 or more of one revolution.

Thus, it is preferable that phase mismatch ranges that are adjacent in the circumferential direction be provided away from each other by a distance corresponding to at least one RUB (i.e., one error correction block). More specifically, it is preferable that the phase mismatch ranges be provided away from each other by a distance corresponding to at least one RUB (i.e., one error correction block) from the front end of one of the phase mismatch ranges adjacent in the circumferential direction to the front end of the other phase mismatch range thereof, or from the trailing end of one of the phase mismatch ranges adjacent in the circumferential direction to the trailing end of the other phase mismatch range thereof. Such an arrangement makes it possible to avoid the coexistence of two phase mismatch ranges in a certain RUB.

(Boundary Portion between Zones)

Figure 10:
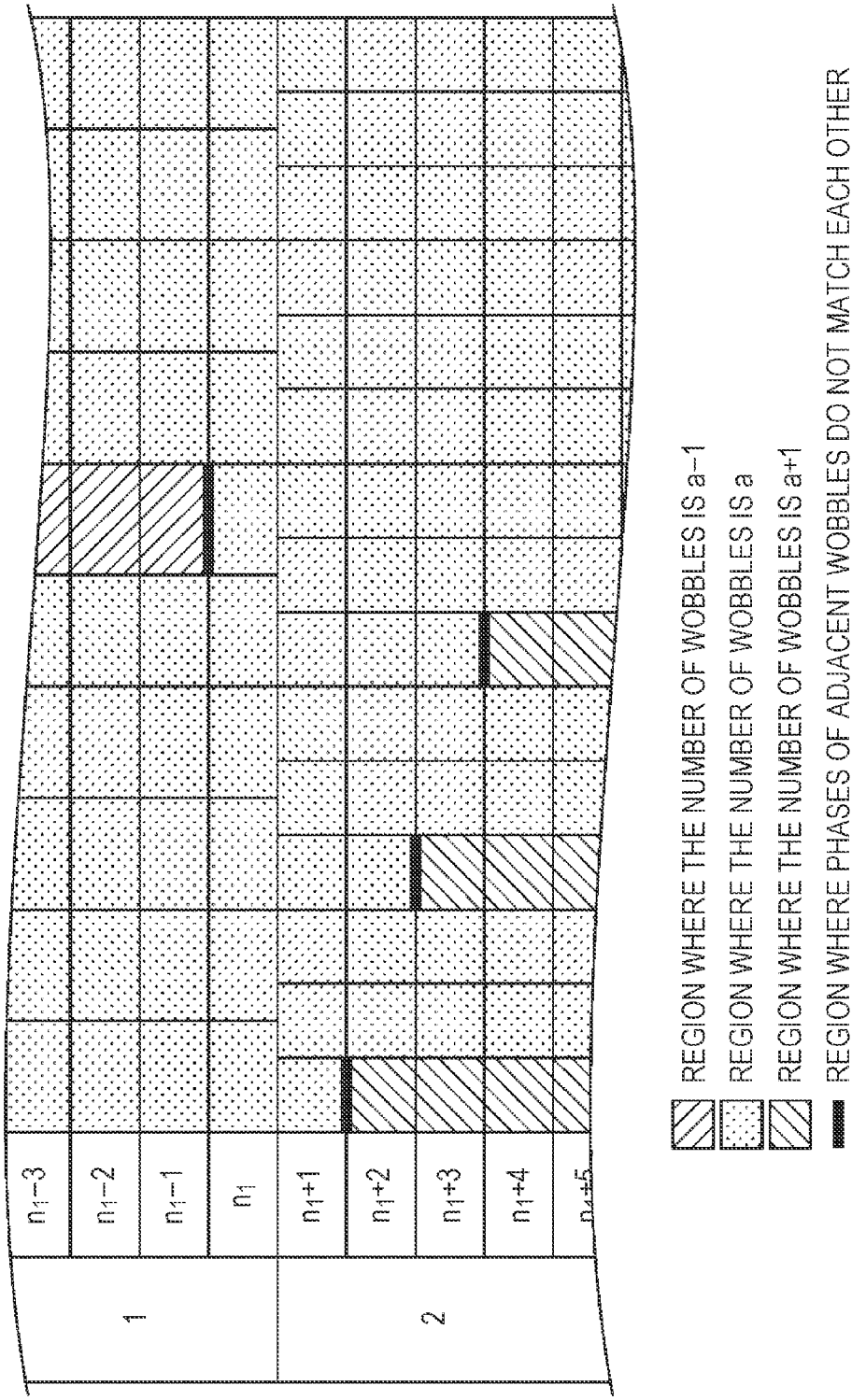
FIG. 10 is a schematic diagram illustrating the format of a boundary portion between zones.

FIG. 10 is a schematic diagram illustrating the format of a boundary portion between zones. The track length at the outer circumference is about 2.4 times the track length at the inner circumference. When the number of angular regions divided in the recording area A on the master disc 1 is changed depending on a radial position thereon, variations in wobble-length change due to an increase in the number of wobbles can be reduced to a certain level or below. It is preferable that, as illustrated in FIG. 10, the change in the number of angular regions divided be performed at the next track after a track in which the numbers of wobbles in all angular regions are the same. That is, the boundary of a zone a be provided between a track in which the numbers of wobbles in all angular regions are the same and the next track after that track. This makes it possible to change the number of angular regions divided, while avoiding the coexistence of angular regions in which the number of wobbles are different from each other.

[2-3. Configuration of Timing Fitter]

The master-disc fabricating apparatus according to the second embodiment is a system in which the phases of wobbles are made to match the phases of adjacent wobbles in a majority of areas on the master disc 1 while achieving compliance with the CLV format, in other words, a system for performing cutting of the master disc 1 according to the disc angular-region division system. Since the master-disc fabricating apparatus according to the second embodiment is substantially the same as that according to the first embodiment, except for the timing fitter 12, only the configuration of the timing fitter 12 will be described below.

Figure 11:
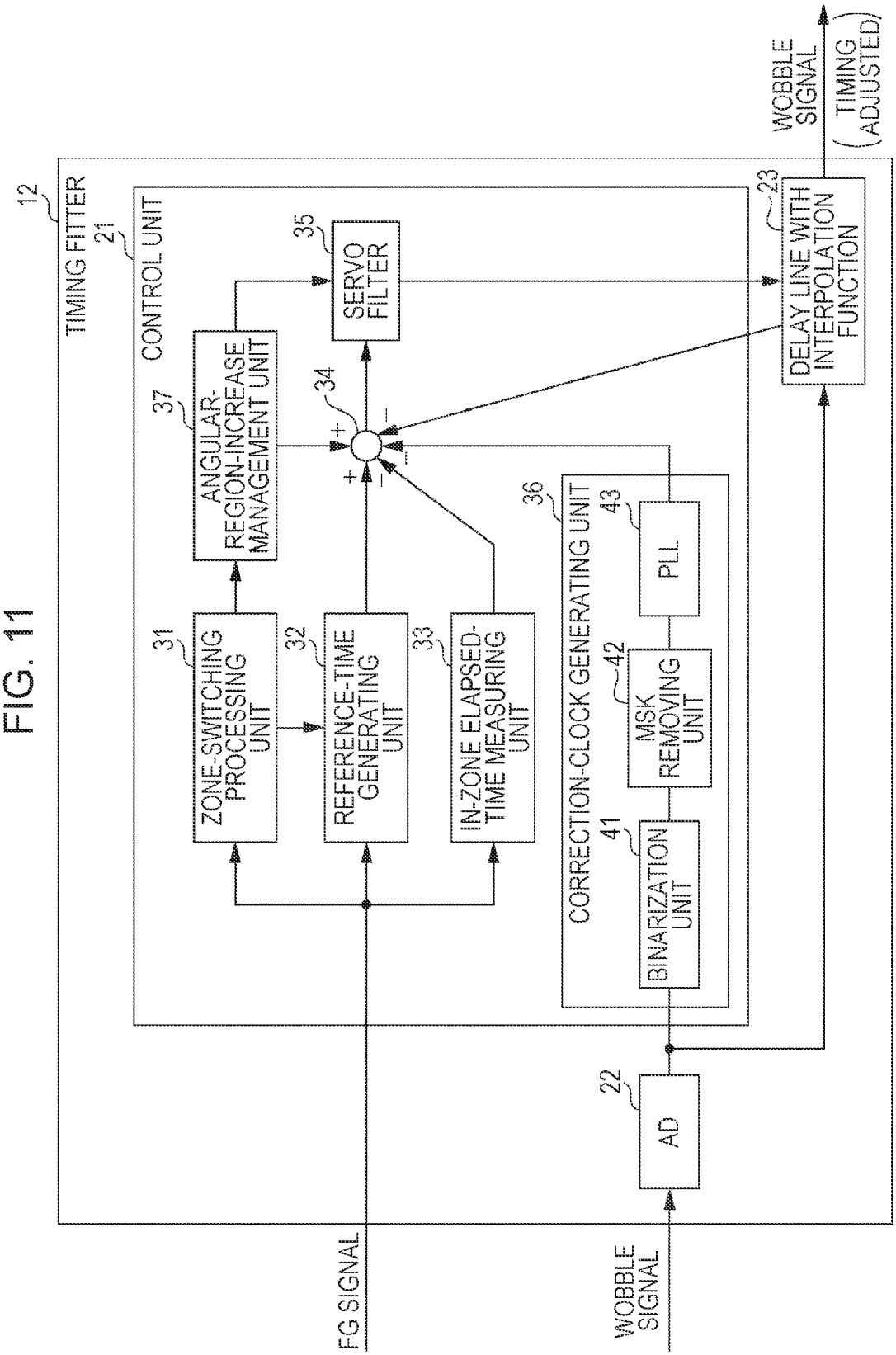
FIG. 11 is a block diagram illustrating one example configuration of a timing fitter according to a second embodiment of the present technology.

FIG. 11 is a block diagram illustrating one example configuration of a timing fitter according to the second embodiment of the present technology. In the second embodiment, elements corresponding to those in the first embodiment are denoted by the same reference numerals. The timing fitter 12 according to the second embodiment further has an angular-region-increase management unit 37.

The control unit 21 adjusts the amount of delay of signals so that the number of wobbles increases in a partial range in one revolution, and adjusts the amount of delay of wobble signals so that the phases of wobbles in the other regions match those of adjacent wobbles at the inner circumference side. It is preferable that the aforementioned partial region in one revolution be a partial range in one track, preferably, a smaller range than one RUB (i.e., one error correction block) per track, and more preferably, one angular region per track. With such an arrangement, the continuous range where the phases wobbles do not match the phases of adjacent wobbles can be limited to a partial range in one track, preferably, to a range smaller than one RUB, and more preferably, to one angular region.

When the amount of delay in the delay line 23 with the interpolation function exceeds a threshold, the control unit 21 adjusts the amount of delay of signals so that the number of wobbles in a partial range in one revolution increases, for example, by one. The above-described partial range may be one of the multiple radially divided angular regions, and the control unit 21 sequentially increases the numbers of wobbles in the angular regions in which the number of wobbles is to be increased, for example, by one. After increasing the number of wobbles in all of the angular regions in which the number of wobbles is to be increased, for example, by one, the control unit 21 updates a reference time that serves as a reference for the amount of delay.

The angular-region-increase management unit 37 is a block for increasing, in an angular region where the number of wobbles is to be increased by one (hereinafter referred to as a "wobble-increase region", as appropriate), the number of clocks by a number (e.g., 69T clocks) corresponding to one wobble. For example, when the master disc 1 is divided into ten regions radially from the center thereof, the angular-region-increase management unit 37 increases the update rate of the delay line 23 with the interpolation function so that the number of wobbles in one entire angular region corresponding to a disc central angle of 36° increases by one. In this case, when the integrator setting value for the servo filter 35 is set to a value reflecting a speed change, correction corresponding to the speed change can be performed by feedforward. Thus, even in the boundary of each wobble-increase region, correction that follows the reference time can be maintained with high accuracy.

The zone-switching processing unit 31 performs an operation as described below. The zone-switching processing unit 31 checks the amount of delay in the delay line 23 with the interpolation function, and increases the number of wobbles per revolution by one, when the amount of delay exceeds a threshold. In this case, when any wobble-increase region where the number of wobbles has not been increased by one remains in the angular regions, an instruction for increasing the number of clocks to increase the number of wobbles by one is issued to the angular-region-increase management unit 37 to thereby increase the number of wobbles per track. When the number of wobbles has been increased by one in all of the wobble-increase regions, an instruction for increasing the number of wobbles per revolution by an amount corresponding to the increased number of angular regions where the number of wobbles has been increased and an instruction for setting the number of wobble-increase regions to zero are respectively issued to the reference-time generating unit 32 and the angular-region-increase management unit 37 at the same time, and then an instruction for increasing the number of wobbles by one is issued to the angular-region-increase management unit 37 again. The threshold for the amount of delay is the number of clocks corresponding to, for example, n wobbles (n is an integer greater than or equal to 1), and more specifically, n×69T clocks.

[2-4. Advantage]

According to the second embodiment, it is possible to perform master-disc cutting that enables the phases of wobbles and the phases of adjacent wobbles on a CLV format disc to match each other in a majority of the recording areas A.

3. Modification

Although the embodiments of the present technology have been specifically described above, the present technology is not limited to the above-described embodiments and various changes and modifications based on the technical idea of the present technology can be made thereto.

For example, the configurations, methods, processes, shapes, materials, numerical values, and so on in the above-described embodiments are merely exemplary, and configurations, methods, processes, shapes, materials, numerical values, and so on that are different from those may also be used, as appropriate.

The configurations, the methods, the processes, shapes, materials, numerical values, and so on in the above-described embodiments can be combined with each other, unless they do not depart from the spirit of the present technology.

Although a configuration in which the master-disc fabricating apparatus has the timing fitter 12 in addition to the formatter 11 and the cutter 13 has been described in the above embodiments, the configuration of the master-disc fabricating apparatus is not limited thereto.

For example, it is possible to employ a configuration in which the formatter 11 has the timing fitter 12 therein and the formatter 11 and the timing fitter 12 are integrated together. With such a configuration, when the formatter 11 and the timing fitter 12 operate in accordance with the same clock, it is possible to omit the correction-clock generating unit 36 in the timing fitter 12.

For example, it is also possible to employ a configuration in which the cutter 13 has the timing fitter 12 therein and the cutter 13 and the timing fitter 12 are integrated together. With such a configuration, the internal block configuration of the timing fitter 12 is analogous to that in the above-described embodiments and is operate without any problem.

For performing ZCAV cutting, since the number of tracks in each zone is large, there are cases in which variations in linear velocity in the zone increase to thereby involve a large amount of delay buffer in the delay line 23 with the interpolation function. In such cases, for example, a configuration as follows may be employed. Specifically, the timing fitter 12 may further have a configuration to output, to the formatter 11, a signal for requesting temporary suspension of the outputting of wobble signals, when the amount of delay in the delay line 23 with the interpolation function exceeds a certain amount, and also to monitor an update of the delay buffer during that period. This can suppress use of the delay buffer. In such a case, however, the formatter 11 further has a configuration for suspending the outputting of wobble signals in response to the request from the timing fitter 12.

Although the master disc 1 having a structure in which the shape layer 3 is provided on the surface of the substrate 2 has been described in the above embodiments, the structure of the master disc 1 is not limited thereto. For example, it is also possible to employ a structure in which a corrugated shape is directly provided on the surface of the substrate 2.

The present technology can also employ the following configuration.

(1) A control device including: a delay unit configured to delay a signal for use in exposure of a master disc; and a control unit configured to adjust an amount of delay of the signal so that an exposure pattern that satisfies an information recording medium format is formed on a master disc rotated by a CLV system.

(2) The control device according to (1), wherein the signal is a wobble signal having a single frequency.

(3) The control device according to (1) or (2), wherein the control unit adjusts the amount of delay of the signal on the basis of a reference time determined using an FG signal.

(4) The control device according to one of (1) to (3), wherein the control unit adjusts the amount of delay of the signal so as to satisfy the number of wobbles per revolution of the master disc, the number of wobbles complying with the format.

(5) The control device according to (4), wherein the control unit adjusts the amount of delay of the signal on the basis of a reference time for satisfying the number of wobbles.

(6) The control device according to one of (1) to (5), wherein the format is a ZCAV format.

(7) The control device according to (1), wherein the control unit adjusts the amount of delay of the signal so that the number of wobbles increases in a partial area in one revolution of the master disc.

(8) The control device according to (7), wherein the control unit adjusts the amount of delay of the signal so that a phase of a wobble in another area in the one revolution matches a phase of an adjacent wobble at one side of the another area.

(9) The control device according to (7) or (8), wherein the partial area is smaller than an error correction block.

(10) The control device according to one of (7) to (9), wherein, when the amount of delay of the delay unit exceeds a threshold, the control unit adjusts the amount of delay of the signal so that the number of wobbles increases in the partial area in the one revolution.

(11) The control device according to one of (7) to (10), wherein the partial area is one of areas that are radially divided, and the control unit sequentially increases the number of wobbles in the divided areas.

(12) The control device according to (11), wherein, upon increasing the number of wobbles in all of the divided areas, the control unit updates a reference time that serves as a reference for the amount of delay.

(13) A control method including: adjusting an amount of delay of a signal for use in exposure of a master disc so that an exposure pattern that satisfies an information recording medium format is formed on the master disc rotated by a CLV system.

(14) A master-disc fabricating apparatus including: a signal generation device configured to generate a signal; an exposure device configured to expose a master disc on the basis of the signal supplied from the signal generation device; and a control device configured to adjust an amount of delay of the signal supplied from the signal generation device to the exposure device, wherein the control device includes a delay unit configured to delay a signal for use in exposure of the master disc, and a control unit configured to adjust the amount of delay of the signal so that an exposure pattern that satisfies an information recording medium format is formed on the master disc rotated by a CLV system.

(15) The master-disc fabricating apparatus according to (14), wherein the signal generation device uses a fixed clock to generate the signal.

(16) The master-disc fabricating apparatus according to (14) or (15), wherein the exposure device includes a drive unit configured to rotate the master disc, and the control device determines a reference time by using an FG signal generated according to the rotation performed by the drive unit and adjusts the amount of delay of the signal on the basis of the reference time.

It should be understood by those skilled in the art that various modifications, combinations, sub-combinations and alterations may occur depending on design requirements and other factors insofar as they are within the scope of the appended claims or the equivalents thereof.

What is claimed is:

1. A control device comprising:
   a delay unit configured to delay a signal for use in exposure of a master disc; and
   a control unit configured to adjust an amount of delay of the signal so that an exposure pattern that satisfies an information recording medium format is formed on the master disc rotated by a constant linear velocity (CLV) system,
   wherein the control unit adjusts the amount of delay of the signal on the basis of a reference time determined using a frequency generator (FG) signal.

2. The control device according to claim 1, wherein the signal is a wobble signal having a single frequency.

3. The control device according to claim 1, wherein the information recording medium format comprises a zone constant angular velocity (ZCAV) format.

4. A control device comprising:
   a delay unit configured to delay a signal for use in exposure of a master disc; and
   a control unit configured to adjust an amount of delay of the signal so that an exposure pattern that satisfies an information recording medium format is formed on the master disc rotated by a constant linear velocity (CLV) system,
   wherein the control unit adjusts the amount of delay of the signal so as to satisfy a number of wobbles per revolution of the master disc, the number of wobbles complying with the information recording medium format.

5. The control device according to claim 4,
   wherein the control unit adjusts the amount of delay of the signal on the basis of a reference time for satisfying the number of wobbles.

6. A control device comprising:
   a delay unit configured to delay a signal for use in exposure of a master disc; and a control unit configured to adjust an amount of delay of the signal so that an exposure pattern that satisfies an information recording medium format is formed on the master disc rotated by a constant linear velocity (CLV) system, wherein the control unit adjusts the amount of delay of the signal so that a number of wobbles increases in a partial area in one revolution of the master disc.

7. The control device according to claim 6, wherein the control unit adjusts the amount of delay of the signal so that a phase of a wobble in another area in the one revolution matches a phase of an adjacent wobble at one side of the another area.

8. The control device according to claim 6, wherein the partial area is smaller than an error correction block.

9. The control device according to claim 6, wherein, when the amount of delay of the signal exceeds a threshold, the control unit adjusts the amount of delay of the signal so that the number of wobbles increases in the partial area in the one revolution.

10. The control device according to claim 6, wherein
the partial area is one of areas that are radially divided, and
the control unit sequentially increases the number of wobbles in the divided areas.

11. The control device according to claim 10, wherein, upon increasing the number of wobbles in all of the divided areas, the control unit updates a reference time that serves as a reference for the amount of delay.

12. A control method comprising:
adjusting an amount of delay of a signal for use in exposure of a master disc so that an exposure pattern that satisfies an information recording medium format is formed on the master disc rotated by a constant linear velocity (CLV) system, wherein the amount of delay of the signal is adjusted so as to satisfy a number of wobbles per revolution of the master disc, the number of wobbles complying with the information recording medium format.

13. A master disc fabricating apparatus comprising:
a signal generation device configured to generate a signal;
an exposure device configured to expose a master disc on the basis of the signal supplied from the signal generation device; and
a control device configured to adjust an amount of delay of the signal supplied from the signal generation device to the exposure device,
wherein the control device includes:
a delay unit configured to delay the signal for use in exposure of the master disc; and
a control unit configured to adjust the amount of delay of the signal so that an exposure pattern that satisfies an information recording medium format is formed on the master disc,
wherein the exposure device includes a drive unit configured to rotate the master disc,
wherein the control device determines a reference time by using a frequency-generator (FG) signal generated according to the rotation performed by the drive unit and adjusts the amount of delay of the signal on the basis of the reference time.

14. The master disc fabricating apparatus according to claim 13, wherein the signal generation device uses a fixed clock to generate the signal.

* * * * *